Feb. 14, 1956
C. H. FISCHER ET AL
2,734,620
APPARATUS FOR FEEDING WORK PIECES FROM
A HOPPER TO A DOWEL CUTTING MACHINE
Filed Aug. 24, 1950
4 Sheets-Sheet 1
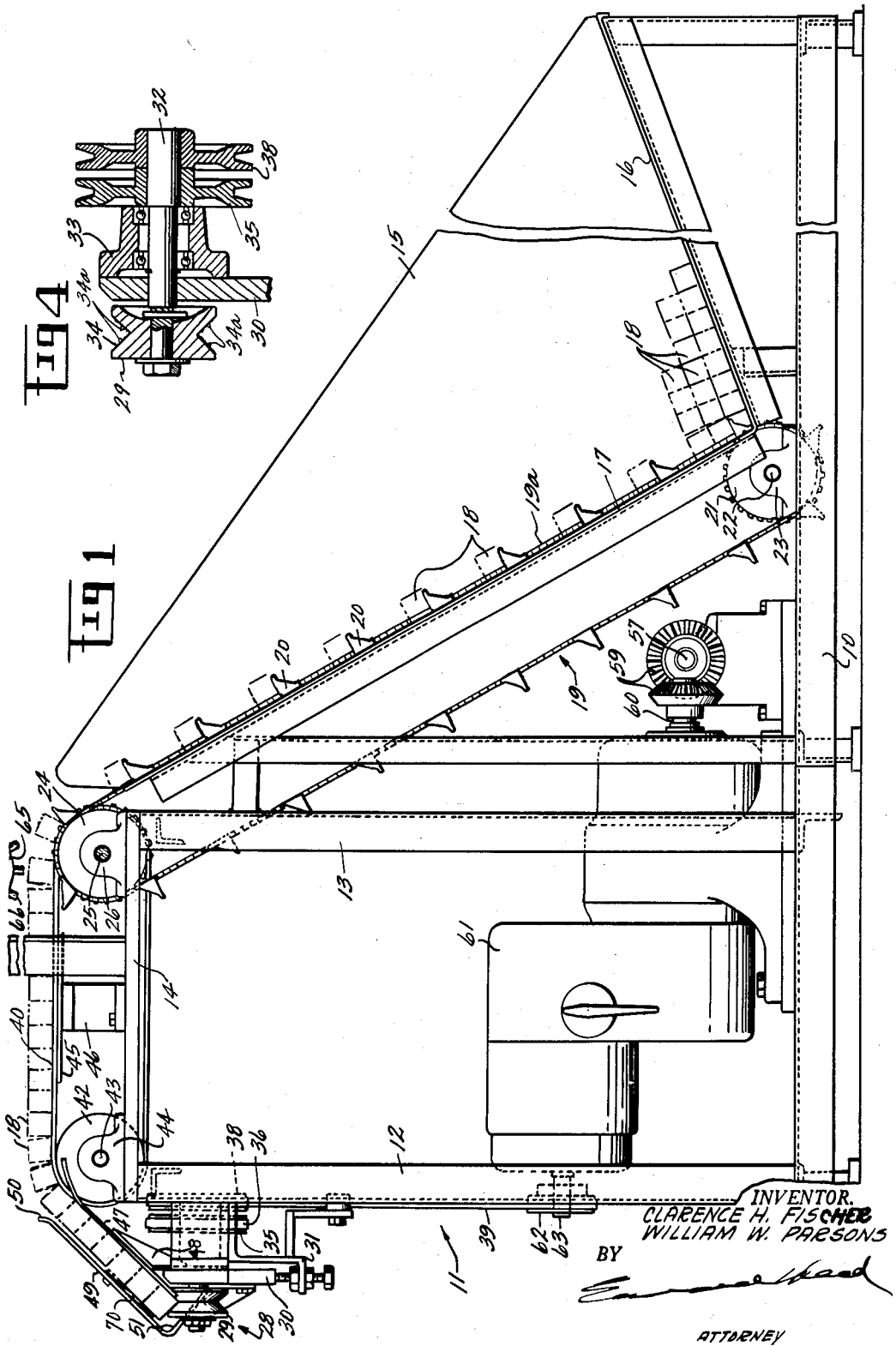
INVENTOR.
CLARENCE H. FISCHER
WILLIAM W. PARSONS
BY
ATTORNEY

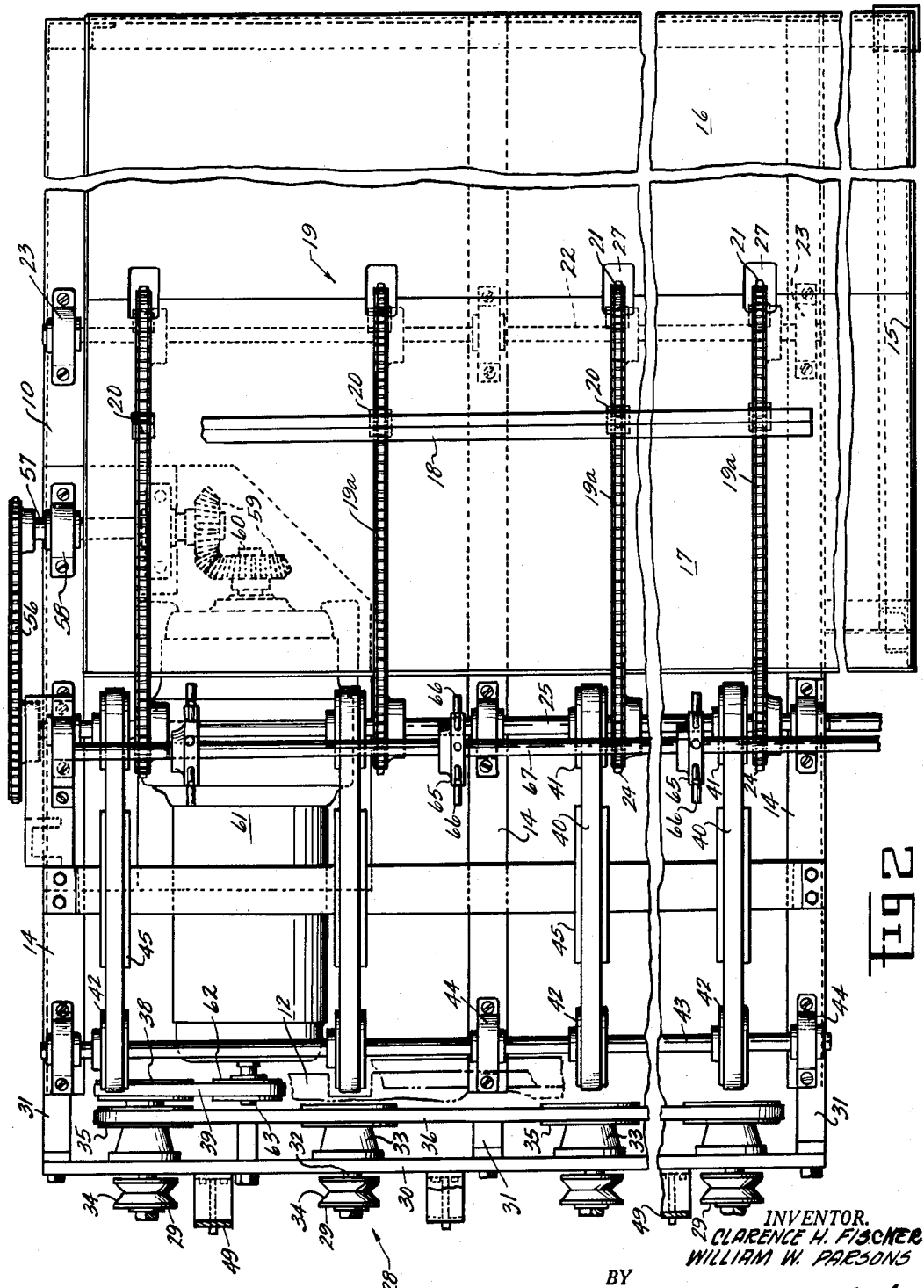

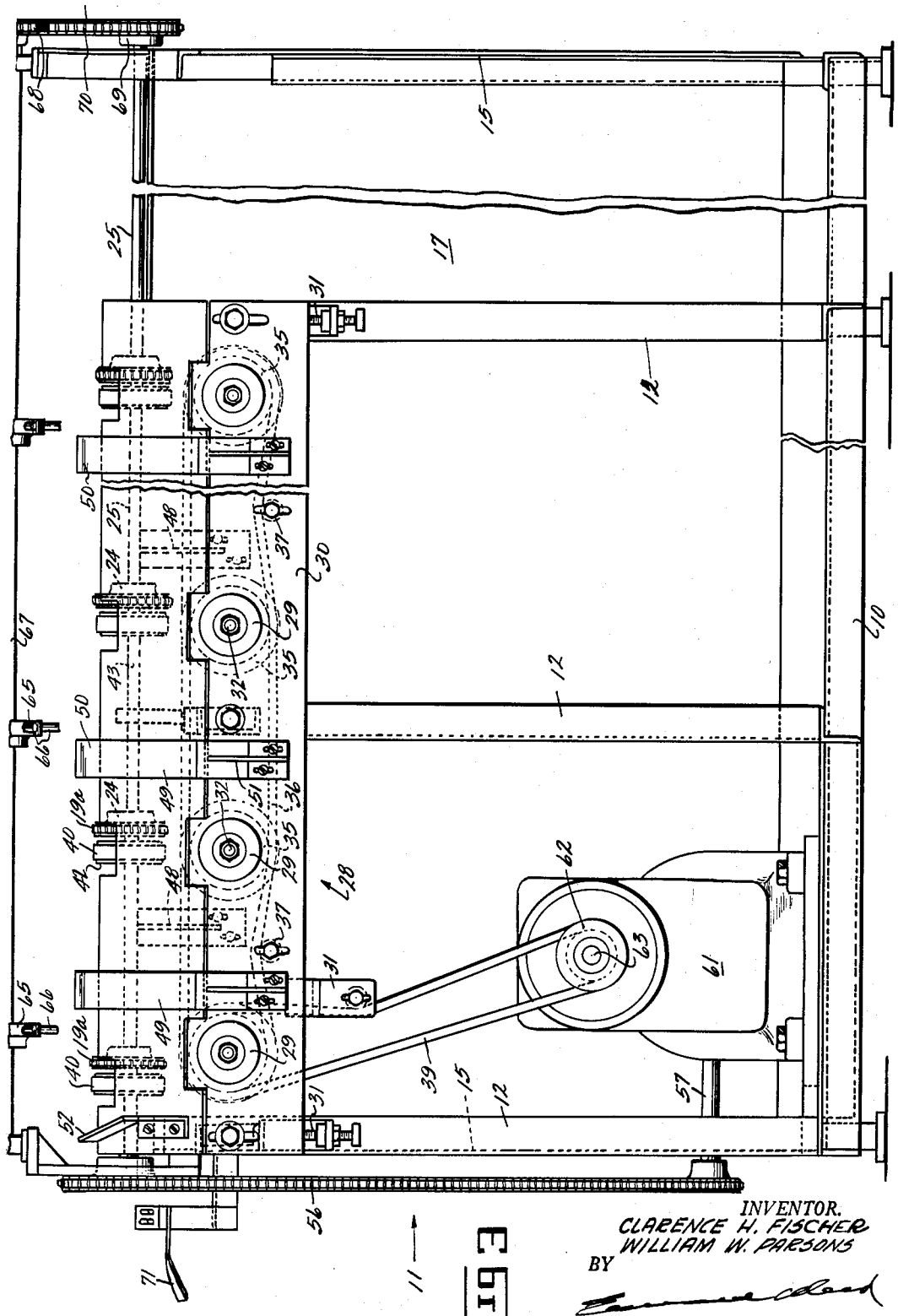

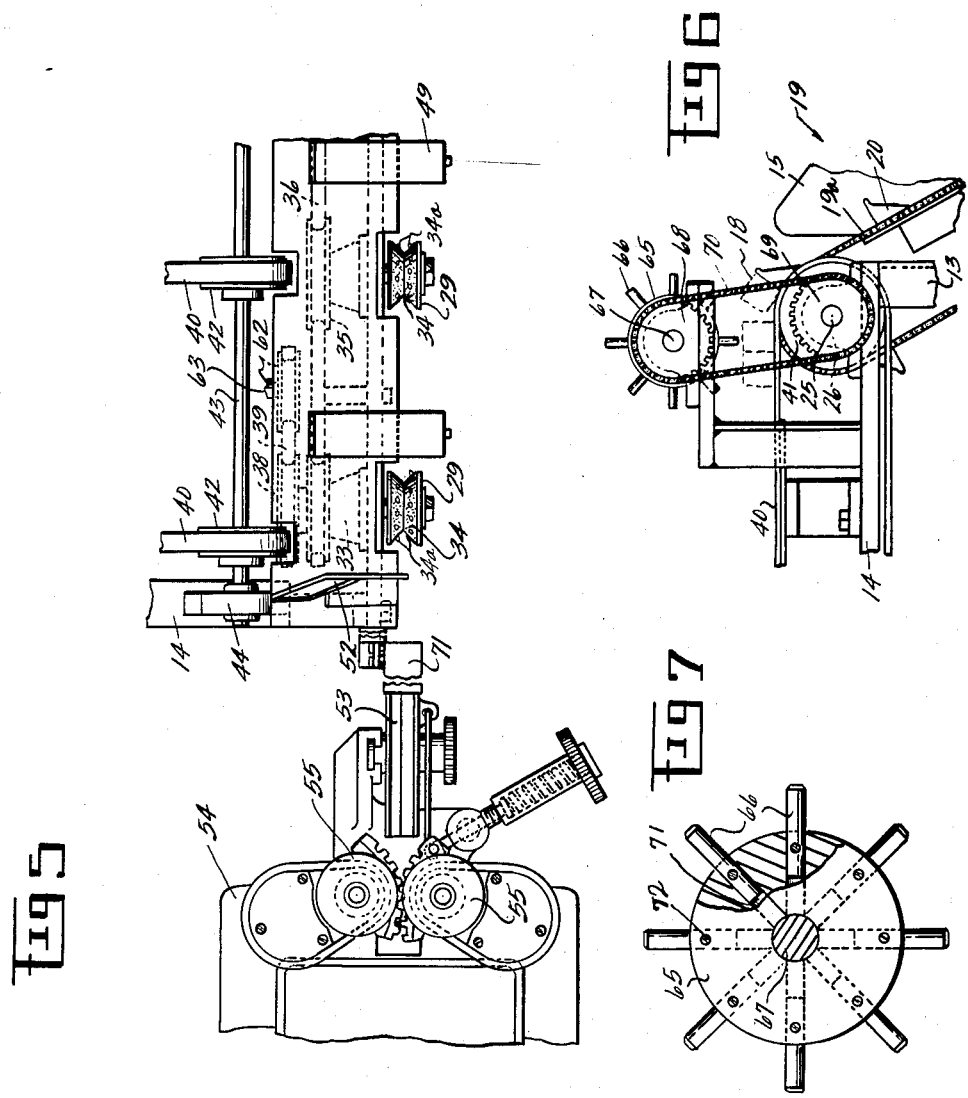

United States Patent Office 2,734,620
Patented Feb. 14, 1956

2,734,620

APPARATUS FOR FEEDING WORK PIECES FROM A HOPPER TO A DOWEL CUTTING MACHINE

Clarence H. Fischer and William W. Parsons, Dayton, Ohio, assignors, by mesne assignments, to The East Dayton Tool and Die Company, Dayton, Ohio, a corporation of Ohio Application August 24, 1950, Serial No. 181,282

8 Claims. (Cl. 198—45)

This invention relates to an apparatus for feeding work pieces from a hopper to a dowel cutting machine.

One object of the invention is to provide a simple, efficient and high speed apparatus which will continuously remove work pieces from the hopper and deliver the same individually to the machine.

A further object of the invention is to provide such an apparatus which will remove elongate pieces from the hopper transversely to their length and then move the same individually and lengthwise to the machine.

A further object of the invention is to provide such an apparatus which will operate satisfactorily on work pieces of various lengths.

A further object of the invention is to provide such a machine having a roller type conveyor to receive the transversely moving work pieces and then move the same in the direction of their length to the machine.

A further object of the invention is to provide such an apparatus having means to receive the work pieces from the hopper, deliver the same successively to the roller conveyor and accurately position the individual work pieces with relation to the rollers of said conveyor.

A further object of the invention is to provide such an apparatus in which the work pieces are delivered to the roller conveyor under pressure.

A further object of the invention is to provide such an apparatus having separate conveyors to remove work pieces from the hopper, to move said work pieces in the direction of their length to the machine and to move the work pieces from the first mentioned conveyor to the second conveyor, and means for preventing an excessive accumulation of work pieces on the last mentioned conveyor.

Other objects of the invention may appear as the apparatus is described in detail.

In the accompanying drawings, Fig. 1 is a side elevation of an apparatus embodying the invention, partly broken away; Fig. 2 is a top plan view of the apparatus, partly broken away; Fig. 3 is an end view showing the roller conveyor mechanism in elevation; Fig. 4 is a sectional detail of one of the rollers of the roller conveyor and its driving pulleys; Fig. 5 is a plan view of portions of the work piece feeding mechanism and of the machine to which the work pieces are to be delivered, showing the relation of the machines one to the other; Fig. 6 is an end elevation of a portion of the apparatus showing a device for removing excessive work pieces from the intermediate conveyor; and Fig. 7 is a detail view, partly in section, of one element of said removing means.

In these drawings we have illustrated one embodiment of the invention and have shown the same as designed for feeding elongate wooden work pieces to a dowel cutting machine, but it is to be understood that the apparatus as a whole, as well as the several parts thereof, may take various forms and that the apparatus may be used to handle work pieces, or other articles, of various kinds without departing from the spirit of the invention.

In the particular embodiment here ilustrated the apparatus comprises a base 10 on which is mounted an upright structure 11 extending for substantially the full width of the base and comprising a series of front standards 12 and a corresponding series of rear standards 13, the standards of the two series being connected at their upper ends by cross bars 14. Mounted at the rear side of the upright structure and preferably on the base 10 is a hopper which may be of any suitable character and, as here shown, comprises side walls 15, a bottom wall 16, and an inclined front wall 17. The front wall preferably extends upwardly and forwardly from the bottom wall to a position adjacent the upper end of the upright structure 11. The hopper is adapted to contain a substantial quantity of elongate work pieces 18, here shown as wooden strips of rectangular cross section, and the bottom wall 16 slopes downwardly from its rear edge toward the lower edge of the front wall 17 so that the work pieces will gravitate toward the front wall.

The hopper is provided with a suitable conveyor 19 for moving the work pieces upwardly from the hopper and preferably this conveyor comprises a plurality of laterally spaced endless work engaging elements, such as chains 19a, each of which is provided with a longitudinal series of lugs 20, or the like, to engage the work pieces and move the same from the hopper. The lower portions of the several chains 19a extend respectively about sprocket wheels 21 which are mounted on a shaft 22 journaled in bearings 23 which are preferably supported on the base 10. The upper portions of the chains extend about the upper sprocket wheels 24 mounted on a shaft 25 journaled in bearings 26 on the upper portion of the upright structure. One stretch of each chain extends through the hopper and moves upwardly on the rear side of the inclined wall 17 of the hopper, the chain and the lugs passing through openings 27 in the bottom wall 16. The shaft 25 is power driven to rotate the upper sprocket wheels 24 in a counter-clockwise direction, as shown in Fig. 1, and thus move the last mentioned stretches of the chains upwardly within the hopper and along the front wall 17 thereof. The corresponding lugs 20 on the several chains are arranged in alinement one with the other so that they will simultaneously engage and support an elongate work piece. The chains are preferably provided in such number and spaced apart such distances so as to enable them to engage and elevate work pieces of various lengths.

The work pieces are moved from the hopper transversely to their length to a second conveyor 28 which, in the present instance, is arranged on that side of the upright structure opposite the hopper and is supported on the upright structure. This second conveyor is of such a character that the work pieces delivered thereto extend lengthwise thereof and the conveyor is moved in a direction to move the work piece which is in engagement therewith in the direction of its length to a desired destination, such as the dowel cutting machine. The second conveyor may be of any suitable character which will receive and move the individual work pieces in this manner. Preferably the second conveyor comprises a series of rollers 29 rotatable about axes transverse to the shaft 25 and arranged in a line extending transversely to the line of movement of the conveyor 19 and so spaced one from the other that a work piece of any length within the range of the apparatus, when delivered thereto, will engage at least two of the rollers. The rollers may be mounted in any suitable manner but as here shown they are carried by an upright plate 30 extending transversely to the conveyor 19 and spaced forwardly a short distance from the standards 12 and rigidly secured thereto, as by brackets 31. Each roller 29 is secured to a shaft 32 which extends through the plate 30 and is rotatably supported in a bearing 33 rigidly mounted on the plate 30 between the latter and the upright structure. Preferably each roller 29 is provided with a peripheral groove 34 shaped to receive and frictionally engage the work pieces. When, as in the present instance, the work pieces are rectangular in shape the side walls of each groove are at a right angle one to the other so as to receive a corner of the work piece and engage the latter with friction sufficient to move the same in the direction of its length. Preferably the walls of the groove are roughened to provide good friction surfaces and, if desired, one or both walls of the groove may be provided with sharp points projecting into the groove, such as short pointed studs 34a, to engage the work piece and drive the same forwardly. Each of the shafts 32 has secured thereto a pulley 35 and a belt 36 extends about the series of pulleys, guides or belt tighteners 37 being provided to maintain the belt in driving engagement with each of the pulleys. The belt may be driven in any suitable manner and in the arrangement shown a second pulley 38 is secured to one of the shafts 32, preferably the shaft for the roller 29 at the discharge end of the second conveyor, and the pulley 38 is connected by a belt 39 with a suitable source of power.

The work pieces removed from the hopper by the conveyor 19 may be delivered from the discharge end of the first conveyor to the second conveyor in any suitable manner. Preferably the means for so delivering the work pieces is of such a character that a continuous series of work pieces is maintained between the discharge end of the first conveyor, 19, and the roller conveyor 28, each succeeding work piece of the series of work pieces being in engagement with and exerting forward pressure on the next preceding work piece so that the foremost work piece of the series of work pieces is pressed into firm engagement with the roller conveyor. In the present construction guide means are provided to receive the work pieces and guide the same into proper engagement with the roller conveyor, and when, as in the present instance, the second conveyor is spaced a substantial distance from the discharge end of the first conveyor, a structure is interposed between the first conveyor 19 and the guide means to support the work pieces in proper relation one to the other as they move toward the guide means. This supporting structure is here shown as a third conveyor which receives the work pieces from the discharge end of the first conveyor and moves at such a speed with relation to the first conveyor that during normal operation it will be filled with work pieces in engagement one with the other. In the form illustrated this third conveyor comprises a plurality of laterally spaced belts 40, each of which is supported at one end on a pulley 41 secured to the shaft 25 and is supported at its other end by a pulley 42 mounted on a shaft 43 which is journaled in bearings 44 mounted on the upright structure of the main frame. Thus the third conveyor moves in the same direction as the first conveyor and, the pulleys 41 being in the present instance of approximately the same diameter as the sprocket wheels 24, it moves at the same speed as the first conveyor and the work pieces move smoothly from the first conveyor onto the third conveyor and are continuously advanced by the third conveyor. The intermediate portions of the belts may be supported against sagging, as by plates 45 engaging the lower surfaces of the upper stretches thereof and carried by a support 46 on the upright structure.

The guide may conveniently comprise a plurality of lower guide members 47 supported in downwardly inclined positions by brackets 48 secured to the plate 30. The upper end of each guide member 47 is preferably curved downwardly and located in a position slightly below the level of the upper stretches of the belts 40 and the lower end of each guide member extends to a position adjacent the path of the work pieces on the conveyor rollers 29. The guide members are arranged in vertical planes extending between adjacent rollers 29 and may be provided in any suitable number. The guide also includes a plurality of upper guide members 49 supported in an inclined plane above and spaced from the inclined plane of the lower guide members, the upper end of each upper guide member being curved upwardly as shown at 50 to facilitate the entrance of the work piece between the upper and lower guide members. The lower end of each upper guide member extends beyond the rollers 29 and is provided with a downwardly extending part 51 which is secured to the supporting plate 30. The lower ends of the upper guide members extend beyond the lower ends of the lower guide members so that a work piece between the lower portions of said guide members will be in supporting engagement with the conveyor rollers and will be moved lengthwise of the second conveyor. The work pieces delivered to the guide would normally move downwardly by gravity and successively drop onto the conveyor rollers, but the present arrangement is such that the guide is normally filled with work pieces, the uppermost of which is in engagement with and is subjected to pressure by that work piece which is being moved onto the guide by the third conveyor 40, and this pressure is transmitted through the intermediate work pieces on the guide to the lowermost work piece which is thus pressed into firm driving engagement with the conveyor rollers, and as the lowermost work piece is moved lengthwise from beneath the next higher work piece the latter work piece is pressed quickly into firm engagement with the rollers. The belts of the third conveyor have friction surfaces which resist the slippage of the belts with relation to the work pieces and normally the third conveyor is filled with work pieces for substantially the full length of the upper stretch thereof. Thus the frictional engagement of the conveyor with the several work pieces thereon is such that those work pieces exert a substantial and constant pressure on the work pieces on the guide and the lowermost work piece is moved into and retained in firm contact with the rollers of the second conveyor. If desired the upper guide members may be spaced from the lower guide members a distance slightly greater than the thickness of the work pieces and leaf springs 70 secured to the upper guide members to press the work pieces firmly against the lower guide members and further resist any tendency of the conveyor rollers to move the lowermost work piece upwardly.

It will be noted that the inclination of the guide members is such that the lowermost work piece in the guide will be delivered to the rolers in such a position that the lower corner thereof will enter the groove in the rollers. The guide may be provided with a third member 52 arranged adjacent the discharge end of the apparatus, as shown in Fig. 5, to limit the lengthwise movement of the work pieces moving through the guide. The discharge end of the roller conveyor is positioned in line with a guide 53 on the dowel cutting machine 54 and is so spaced therefrom that the forward end of a work piece being advanced by the conveyor will engage the guide 53 before the rear end thereof moves beyond the conveyor and the next succeeding work piece on the conveyor will move the first mentioned work piece into engagement with feed rollers 55 of the dowel cutting machine. The speed at which the work pieces are moved by the roller conveyor is controlled by the cutting machine and each succeeding work piece delivered to the conveyor engages the next preceding work piece and continues the movement thereof after it passes the last roller. Sometimes the rear end of a work piece moving from the conveyor to the cutting machine tends to move upwardly after it passes beyond the last guide members and to prevent this a guide 71 may be mounted on the main frame of the feeding mechanism above and close to the path of the work pieces just in advance of the cutting machine guide 53.

Under some conditions of operation there may be a tendency of the work pieces discharged from the hopper to accumulate on the intermediate conveyor 40 in excessive numbers and to pile up in an objectionable manner. To prevent this excessive accumulation of work pieces there is provided a device supported above the third conveyor to engage any work piece which may be piled on the work pieces which rest on the conveyor or which extend an objectionable distance above the path of the work pieces on the conveyor. This device may take various forms and is here shown as comprising a series of elements rotatably supported above the normal path of the work pieces on the conveyor 40 and having parts to engage work pieces which extend substantially above the normal path of articles on said conveyor and return them to the hopper. As here illustrated, each element comprises a disc-like body 65 having a plurality of substantially radial fingers, or pins, 60 projecting beyond the periphery thereof. The several elements 65 are rigidly mounted on a shaft 67 which is rotatably supported on the frame of the machine above and slightly beyond the vertical plane of the shaft 25. As shown in Figs. 1 and 3 the shaft is supported such a distance above the conveyor 40 that the pins of each element will move in a circular path above and spaced from the path of the work pieces on the conveyor and any work pieces which may be projected upwardly a material distance above the normal path of the work pieces on that conveyor, or are piled onto work pieces on that conveyor, are engaged by the fingers and moved rearwardly with relation to the conveyor 40 and discharged into the hopper. Preferably the fingers 66 are radially adjustable with relation to the supporting discs to enable them to be positioned according to the size of the work pieces being removed from the conveyor. For this purpose each disc 65 is provided with substantially radial sockets 71 in which the respective fingers 66 are mounted, and the fingers are secured in adjusted positions by set screw 72. The shaft 67 may be rotated by any suitable means. In the present arrangement, it is provided adjacent one end thereof with a sprocket wheel 68 which is connected by a sprocket chain 70 with a sprocket wheel 69 on the adjacent end of the shaft 25.

The apparatus may be operated in any suitable manner and as here shown the shaft 25 is connected by a sprocket chain 56 with a shaft 57 journaled in bearings 58 on the base 10, and the shaft 57 is connected by bevel gears 59 with a power output shaft 60 of an electric motor 61, the conveyor chains 19*a* and the belts 40 being thus driven continuously at the same speed. The belt 39 which drives the roller type conveyor engages a pulley 62 on a second power output shaft 63 of the motor 61, which rotates at a speed substantially higher than the speed of the power output shaft 60, thus the roller type conveyor is operated at a speed sufficiently high to move each elongate work piece quickly out of the path of the succeeding work piece, and the apparatus operates to move the work pieces continuously and in rapid succession from the hopper to the machine.

While we have described one embodiment of our invention, we wish it to be understood that we do not desire to be limited to the details thereof as various modifications may occur to a person skilled in the art.

Having fully shown and described our invention, what we claim as new and desire to secure by Letters Patent, is:

1. An apparatus for delivering work pieces to a machine which performs work thereon, comprising a supporting structure, a hopper at one side of said structure adapted to contain a quantity of work pieces, a conveyor movable upwardly through said hopper to engage work pieces therein and move the same from said hopper, a second conveyor provided with a pair of surfaces disposed at a substantial right angle with respect to one another and at a substantial 45° angle with respect to the horizontal, and located at the other side of said structure operable to move work pieces individually and in a direction transverse to the first mentioned conveyor to said machine, guide means extending downwardly at an angle to the vertical and adapted to receive work pieces discharged from said first mentioned conveyor and to support a plurality of work pieces in engagement one with the other and with the lowermost work piece in engagement with said second conveyor, whereby upon the removal of said lowermost work piece by said second conveyor the next higher work piece on said guide will move into engagement with said second conveyor, and means for operating said conveyors.

2. An apparatus for delivering work pieces to a machine which performs work thereon, comprising a hopper adapted to contain a quantity of elongate work pieces each substantially rectangular in cross section, a conveyor movable upwardly through said hopper to successively engage work pieces and move the same transversely to their length from said hopper, a plurality of rollers arranged in a line transverse to the line of movement of said conveyor and adapted to receive work pieces which have been removed from the hopper by said conveyor and to move the same in the direction of their length to said machine, each of said rollers having a peripheral groove, the walls of which are at substantially a right angle one to the other, means for delivering said work pieces from said conveyor to said rollers including guide means to receive and support a plurality of work pieces in contact one with the other, said guide means extending at an acute angle to the axes of said rollers to support said work pieces in positions in which the lower corner of the lowermost work piece will enter the grooves in said rollers.

3. An apparatus for delivering work pieces to a machine which performs work thereon, comprising a supporting structure, a hopper at one side of said structure adapted to contain a quantity of work pieces, a conveyor movable upwardly through said hopper to engage work pieces therein and move the same from said hopper, a second conveyor supported on said structure said conveyor being provided with a pair of surfaces disposed at a substantial right angle with respect to one another and operable to move work pieces individually and in a direction transverse to the first mentioned conveyor to said machine, guide means supported on said structure and extending downwardly at an angle to the vertical and adapted to receive work pieces discharged from the first mentioned conveyor and guide the same to said second conveyor and press the foremost work piece into driving engagement with said second conveyor.

4. An apparatus for delivering work pieces to a machine which performs work thereon, comprising a supporting structure, a hopper at one side of said structure adapted to contain a quantity of work pieces, a conveyor movable upwardly through said hopper to engage work pieces therein and move the same from said hopper, a second conveyor supported on said structure and operable to move work pieces individually and in a direction transverse to the first mentioned conveyor to said machine, guide means on said structure to receive a plurality of work pieces discharged from the first mentioned conveyor, support the same in contact one with the other and guide work pieces successively to said second conveyor, and means for subjecting the work pieces on said guide means to pressure in the direction of their movement and thereby press the foremost work piece into firm engagement with said second conveyor, and means for operating said conveyors.

5. An apparatus for delivering work pieces to a machine which performs work thereon, comprising a supporting structure, a hopper at one side of said structure adapted to contain a quantity of work pieces, a conveyor movable upwardly through said hopper to engage work pieces therein and move the same from said hopper, a second conveyor supported on said structure and operable to move work pieces individually and in a direction transverse to the first mentioned conveyor to said machine, guide means on said structure to receive a plurality of work pieces discharged from the first mentioned conveyor, support the same in contact one with the other and guide said work pieces successively to said second conveyor, and a conveyor to receive work pieces from the first mentioned conveyor, continuously deliver said work pieces to said guide means and thereby subject said work pieces on said guide means to pressure to press the foremost work piece into firm engagement with said second conveyor, and means for operating said conveyors.

6. An apparatus for delivering work pieces to a machine which performs work thereon, comprising a hopper adapted to contain a quantity of elongate work pieces, a conveyor movable upwardly through said hopper to successively engage work pieces and move the same transversely to their length from said hopper, a plurality of rollers arranged in a line transverse to the line of movement of said conveyor, said rollers being provided with surfaces disposed at a substantial right angle with respect to one another, and at a substantial 45° angle with respect to the axis of rotation of said rollers and adapted to receive work pieces that have been moved from said hopper by said conveyor and to move the same in the direction of their length to said machine, guide means extending downwardly at an angle to the vertical and adapted to receive a plurality of work pieces from said conveyor, support the same in engagement one with the other and deliver said work pieces successively to said rollers, the work pieces moving from said conveyor onto said guide mean exerting pressure on the work pieces which are on said guide means and pressing the foremost work piece into firm engagement with said rollers, and means for operating said conveyor and said rollers.

7. An apparatus for delivering work pieces to a machine which performs work thereon, comprising a hopper adapted to contain a quantity of elongate work pieces, a conveyor movable upwardly through said hopper to successively engage work pieces and move the same transversely to their length from said hopper, a plurality of rollers arranged in a line transverse to the line of movement of said conveyor and adapted to receive work pieces that have been moved from said hopper by said conveyor and to move the same in the direction of their length to said machine, guide means adapted to receive a plurality of work pieces from said conveyor, support the same in engagement one with the other and deliver said work pieces successively to said rollers, a conveyor for moving work pieces from the first mentioned conveyor onto said guide means and thereby subject the work pieces on said guide means to pressure in the direction of their movement, and means for operating said conveyors and said rollers.

8. An apparatus for delivering work pieces to a machine which performs work thereon, comprising a hopper adapted to contain a quantity of elongate work pieces, a conveyor movable upwardly through said hopper to successively engage work pieces and move the same transversely to their length from said hopper, a plurality of rollers arranged in a line transverse to the line of movement of said conveyor and adapted to receive work pieces that have been moved from said hopper by said conveyor and to move the same in the direction of their length to said machine, inclined guide means adapted to receive a plurality of work pieces and support the same one upon the other with the lowermost work piece in engagement with said rollers, a conveyer to deliver work pieces from the first mentioned conveyor to said guide means, means for actuating the last mentioned conveyor to move an additional work piece onto said guide means upon the removal of the lowermost work piece by said rollers, thereby exerting pressure on the work pieces on said guide means and moving the same toward said rollers, and means for operating the first mentioned conveyor and said rollers.

References Cited in the file of this patent

UNITED STATES PATENTS

| | | |
|---|---|---|
| 843,519 | Crane | Feb. 5, 1907 |
| 1,541,118 | Cole | June 9, 1925 |
| 1,861,113 | Coberly | May 31, 1932 |
| 1,972,489 | Rideout et al. | Sept. 4, 1934 |
| 2,159,851 | Hicks | May 23, 1939 |
| 2,209,340 | Landry | July 30, 1940 |
| 2,410,492 | Garrow | Nov. 5, 1946 |
| 2,492,250 | Wilcox | Dec. 27, 1949 |
| 2,572,374 | Oas | Oct. 23, 1951 |